INVENTOR.
WILLIAM H. WILLERT

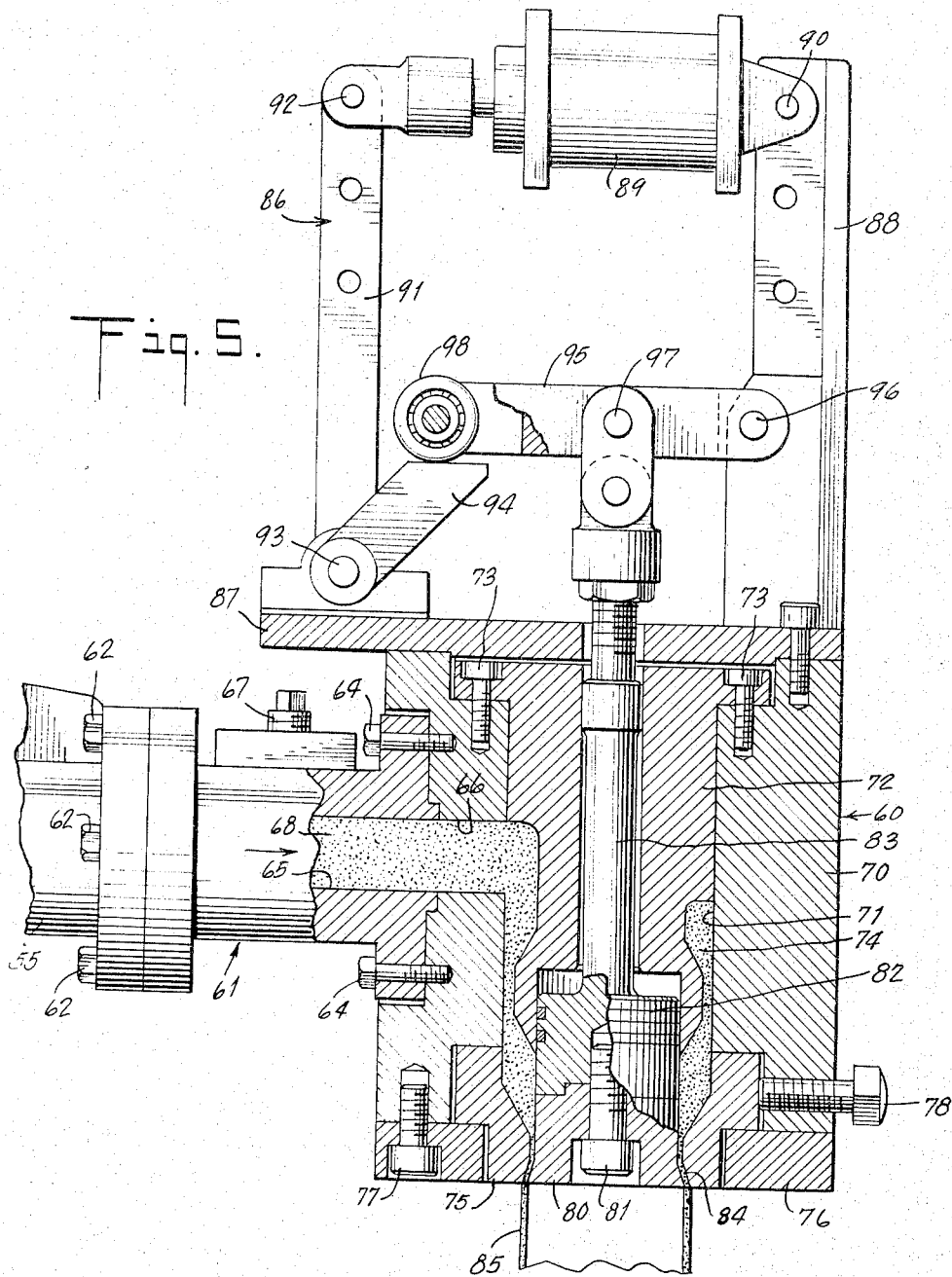

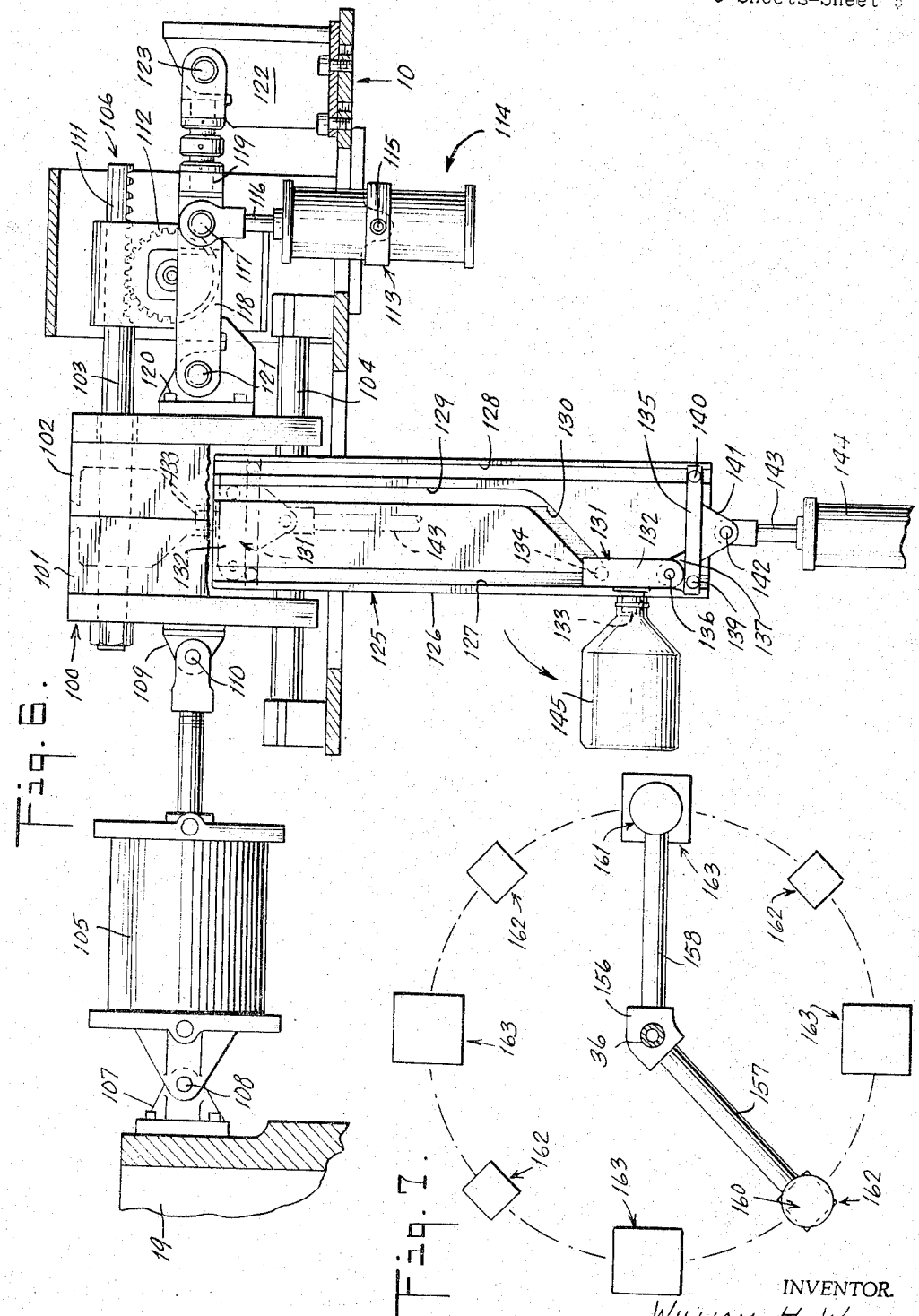

United States Patent Office 3,355,763
Patented Dec. 5, 1967

3,355,763
ROTARY PARISON HEAD BLOW MOLDING MACHINE
William H. Willert, North Plainfield, N.J., assignor to Frank W. Egan & Co., Somerville, N.J., a corporation of New Jersey
Filed May 17, 1965, Ser. No. 456,327
16 Claims. (Cl. 18—5)

This invention relates to the manufacture of hollow plastic articles which are formed from extruded plastic material. The invention pertains, more particularly, to a machine which is of the type commonly referred to in the art as a "blow molding machine" and which has improved features of design and construction. The invention is concerned, in one of its specific aspects, with a blow molding machine which is capable of continuously and economically forming such articles at high production rates.

It is generally recognized that hollow plastic articles produced by blow molding procedures, such as thermoplastic receptacles for containing and dispensing various fluids including liquid detergents, bleaches, milk and the like, afford a number of worthwhile advantages over similar articles composed of other materials, such as glass, plastic coated paper and the like. It is essential, however, that the plastic articles be produced at low unit cost and in large quantities in order to compete economically with similar articles composed of the other indicated materials. To achieve effective economic competition, the blow molding machine must be so designed and constructed as to operate substantially continuously for extended time periods so as to provide a high quality product at high output rates and low supervisory and maintenance labor costs.

In order to fully utilize the output capacity of a plastic extruder and thereby attain high article production rates, it has been found necessary to employ a plurality of molds for the blowing, cooling and ejection operations. This permits extrusion of the parison into one mold while the plastic previously deposited in other molds is undergoing blowing, cooling and ejection. Since the total time required for blowing, cooling and ejection is considerably longer than that required for extrusion of the parison into a mold, it is desirable to provide at least four molds. This allows the extruder to operate continuously or in a manner as near continuous as possible. Also, it is necessary, in order to utilize multiple molds, to provide suitable means for extruding the plastic parison into the molds in sequence so that the steps of blowing, cooling and ejection may be carried out in one or more molds while another mold is being loaded with plastic preliminary to blowing.

There are several known blow molding machines that utilize multiple molds. One such machine employs a stationary manifold which is connected to the discharge of the plastic extruder and which is provided with two or more spaced outlets for transmitting the plastic to corresponding molds that are also stationary. The manifold is equipped with valves for controlling and directing the flow of the plastic to the various molds in preselected sequence. This machine, while generally satisfactory for two mold arrangements, is objectionable for a greater number of molds due to the fact that it requires complex and troublesome manifold valving. Moreover, the long delivery passages wherein the plastic is stored, i.e. remains static during various stages of operation, presents further problems, especially when the machine is handling a heat sensitive plastic, such as rigid polyvinyl chloride.

Another known type of multiple mold machine is one that is frequently referred to as the "rotary blow molding machine," for the reason that its molds are mounted on a horizontal or vertical indexing rotary table. In this machine, the extruder is stationary and has a single discharge position. During operation, the rotary table successively aligns each mold with the extruder discharge. While rotary blow molding machines may be equipped with a substantial number of molds, their rotary tables are, of necessity, large, heavy and cumbersome, and, consequently, have a high moment of inertia, requiring high torque and expensive indexing equipment. Also, since the molds themselves, the mold actuating mechanisms and ancilliary devices require various services, such as compressed air, water, electric energy, etc., it is necessary to provide complex, expensive and troublesome auxiliary equipment for connecting these services to the parts carried by the table.

As will be readily apparent from the detailed description that follows and from the accompanying drawings, the blow molding machine of this invention constitutes an important advance in the art for the reasons that (1) it embodies novel and improved features of design and construction; (2) it is capable of economically producing hollow plastic articles at a high unit rate; (3) it is devoid of the objections to and the disadvantages inherent in conventional blow molding machines; and (4) it affords a number of advantages as compared to conventional machines.

It is the primary object of this invention to provide a blow molding machine having novel and improved features of design and construction.

Another object of this invention is the provision of a blow molding machine having its parts so constructed and arranged as to operate substantially continuously and produce hollow plastic articles economically and at a high unit rate.

A further object of the invention is to provide a blow molding machine which is capable of simultaneously producing hollow plastic articles of different sizes and/or configuration.

A still further object of this invention is to provide a machine of the character indicated that is relatively simple in design; that is sturdy and durable in construction; that is reasonable in manufacturing and maintenance costs; and that is capable of performing its intended functions in a dependable and trouble-free manner.

To the end that the foregoing objects may be readily attained, a blow molding machine according to this invention preferably comprises a support means in the form of a rigid frame; a source of semi-fluid plastic material, such as a continuous plastic extruder, mounted on the frame; a pair of parison heads, each including an extrusion nozzle for extruding the plastic material in tubular form; flow means for transmitting the plastic material from the source to each nozzle and comprising a hollow rotary shaft, which communicates at its upper end with the source of plastic material, a manifold unit secured to and rotatable with the shaft and having a pair of transfer tubes extending laterally from opposite sides of the axis of rotation of the shaft. Each parison head is affixed to the outer end of a transfer tube and each transfer tube is in communication with the lower end of the shaft and with a corresponding nozzle. The machine also comprises a plurality of mold assemblies mounted on the support means and spaced along the circumference of a circle having a center which is coincident with the axis of rotation of the shaft. Included in the machine is an indexing drive means for imparting rotation to the shaft and effecting sequential alignment of the nozzle of each parison head with the mold assemblies in the course of each revolution of the shaft. Each transfer tube is provided with a valve for controlling the flow of the plastic material therethrough. The parts of the machine are so constructed and arranged that the mold assemblies are disposed in fixed locations, i.e. stationary, while the parison heads are rotatable and adapted to service the molds sequentially during each revolution of the rotary shaft.

The enumerated objects and additional objects, together with the advantages of the invention, will be readily understood by persons trained in the art from the following detailed description taken in conjunction with the accompanying drawings which describe and illustrate several forms of construction embodying the invention.

In the drawings, wherein like reference numerals denote corresponding parts throughout the several views:

FIG. 5 is an enlarged view of one of the parison head assemblies which are also shown in FIGS. 1 and 2, certain parts being broken away and other parts being shown in central vertical cross-section for better illustration;

FIG. 6 is an enlarged view of one mold and ejector assembly appearing in FIGS. 1 and 3, certain parts being shown in central vertical cross-section for better illustration; and FIG. 7 is a partly diagrammatic plan view of a manifold unit, parison heads and molds according to a modified form of the invention.

Figure 1:
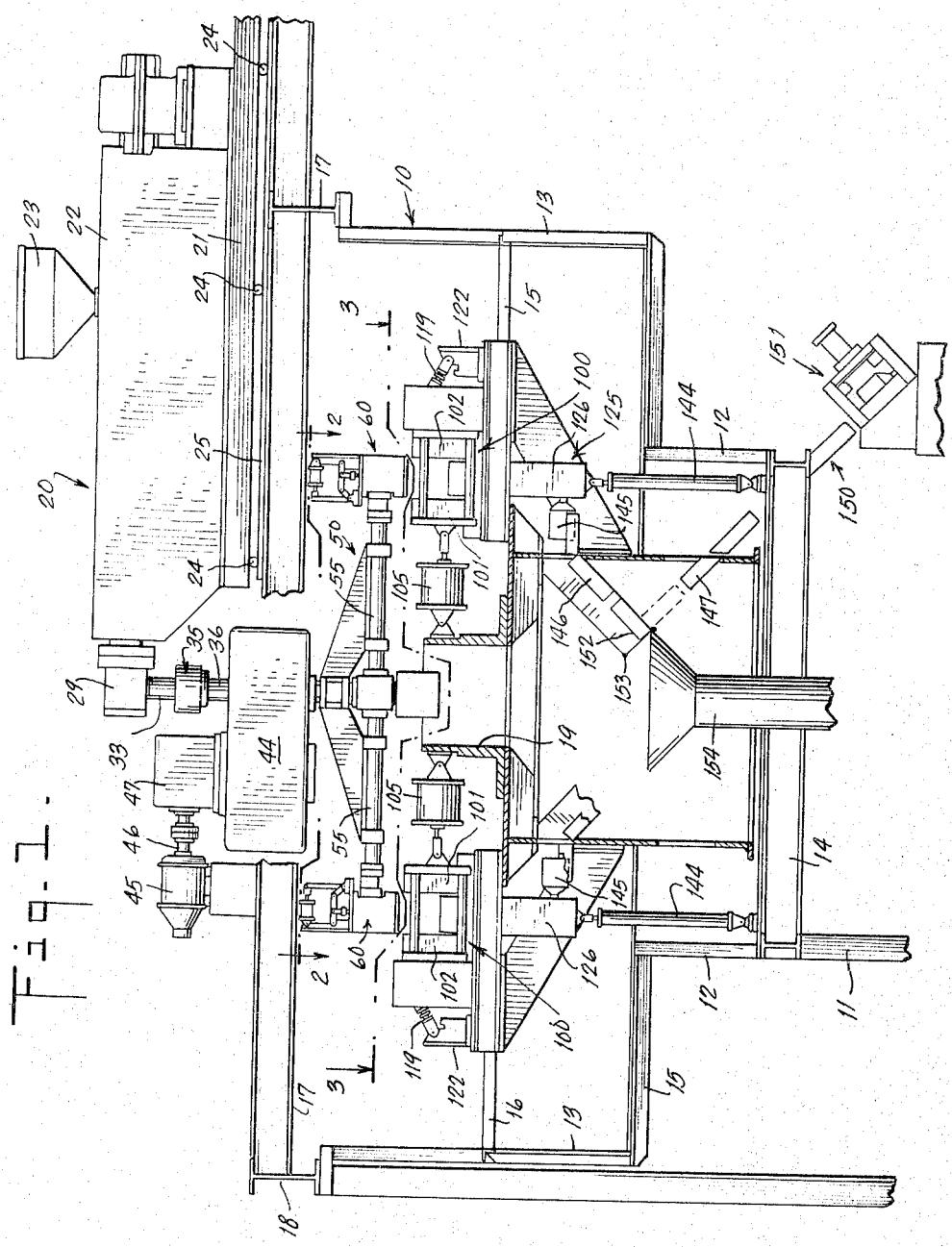
FIG. 1 is a side elevation view of a blow molding machine constructed in accordance with this invention.
Figure 2:
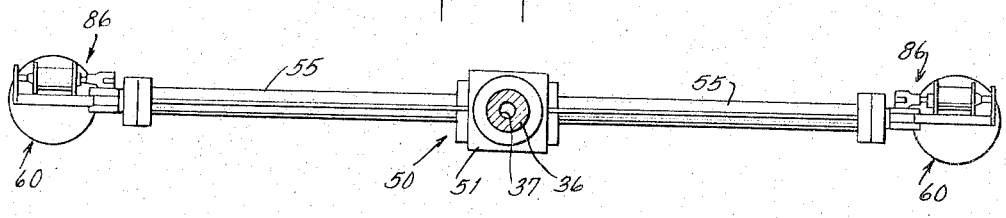
FIG. 2 is a view on an enlarged scale taken along staggered line 2—2 of FIG. 1.
Figure 3:
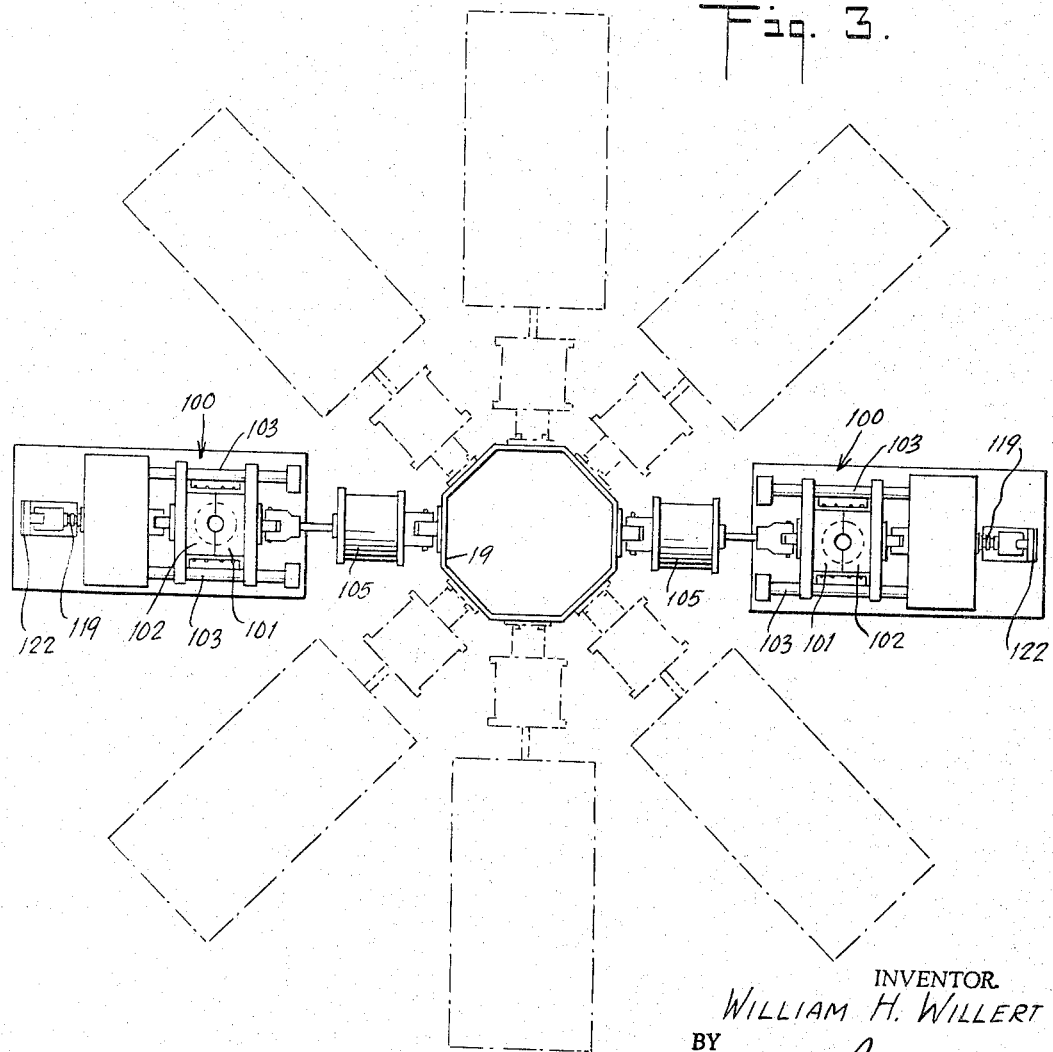
FIG. 3 is a view on an enlarged scale taken along staggered line 3—3 of FIG. 1, details of various parts which are duplicates of illustrated parts being omitted.

Reference is first had to FIGS. 1, 2 and 3 which illustrate a blow molding machine according to this invention and including support means, a plastic extruder, a rotary manifold unit carrying dual parison heads, an arrangement of eight stationary molds and a number of other devices, all of which will be identified and described in detail further along herein.

The support means or frame is generally denoted by the numeral 10 and, as best shown in FIG. 1, includes a plurality of vertical numbers 11, 12 and 13, a plurality of horizontal members 14, 15, 16, 17 and 18 and an upstanding hollow octagonal member 19 within the outer confines of the frame. The various frame members are joined together by welding or in any other desired manner to obtain a rigid and sturdy supporting structure for the machine.

Mounted on the frame is a plastic extruder 20 comprising a carriage 21, a housing 22, and a plastic feed hopper 23. The extruder is provided with wheels 24 that ride on rails 25 on the frame to allow it to be retracted from operating position to permit necessary cleaning or other services, as required. The extruder also comprises a feed screw 26 (FIG. 4) that is rotatable in a delivery barrel 27 having a flange 28 at its free or discharge end. For the purpose of this application, extruder 20 constitutes a source of semi-fluid plastic material of any preferred composition. The extruder may be of any known continuous type or reciprocating screw type, such as that disclosed in my Patent No. 2,734,226, entitled "Injection Molding Apparatus," to which reference may be had for additional details of construction.

Figure 4:
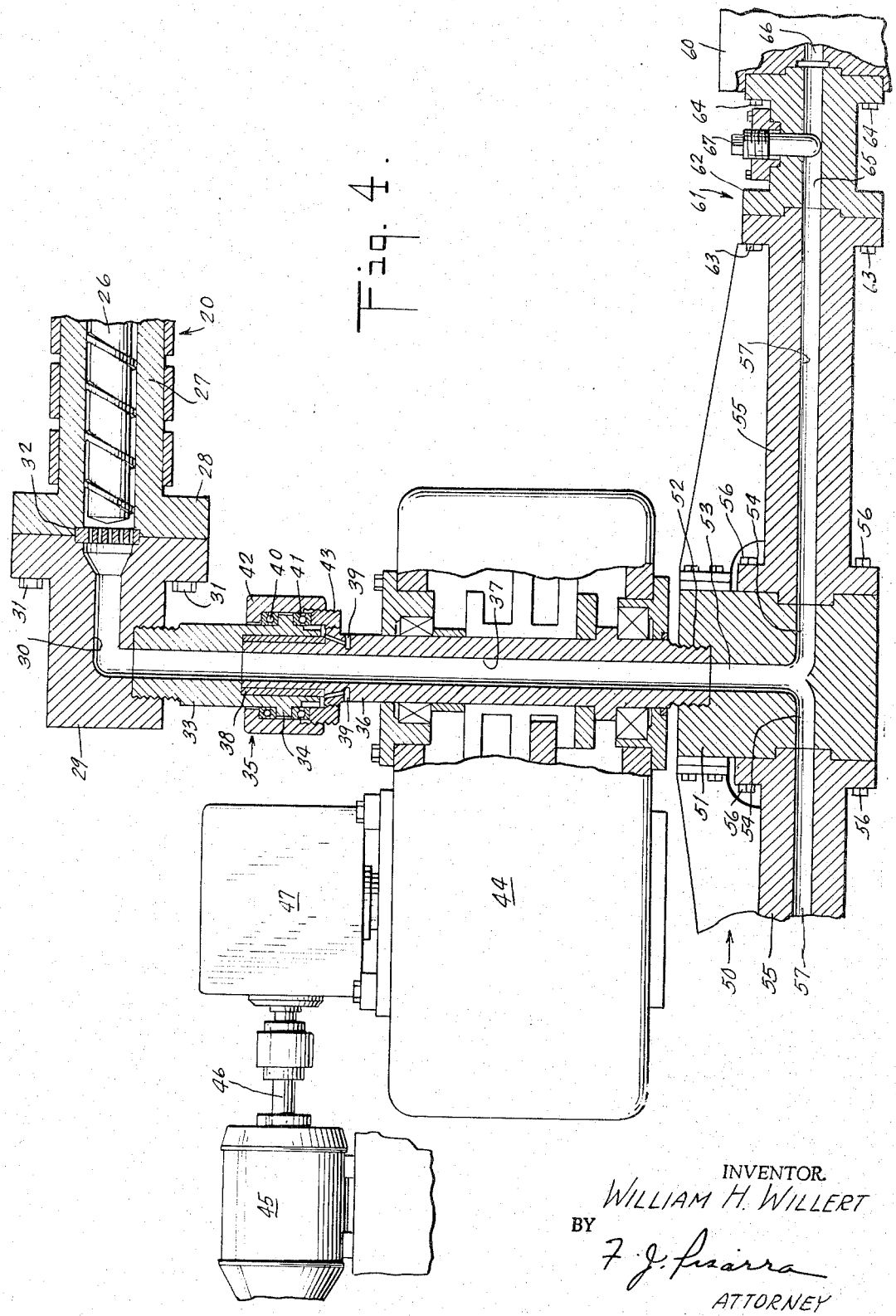
FIG. 4 is an enlarged view of the upper central portion of FIG. 1, certain parts being shown in central vertical cross-section for better illustration.

As is best shown in FIG. 4, an adapter 29, having an L-passage 30, is secured to the discharge end of delivery barrel 27 by screws 31. Seated within aligned recesses at the abutting ends of the adapter and the delivery barrel is a conventional perforate breaker plate 32. Threadedly connected to adapter 29 is a vertical downpipe 33 having an integral outer flange 34 adjacent its lower end. The downpipe is stationary and constitutes a part of a rotary coupling which is generally indicated at 35. A hollow, rotary indexing shaft 36 defines an axial passage 37 which communicates with downpipe 33. The upper end of shaft 36 projects into the lower end of the downpipe, as shown, and a sleeve bushing 38 is interposed therebetween for the dual purposes of providing a suitable bearing surface for the shaft and affording an effective seal to prevent undue leakage of plastic material in the course of normal flow. Bushing 38 is composed of a material capable of properly withstanding high temperatures and pressures. One such material, which has been found entirely satisfactory, is graphite impregnated bronze. The indexing shaft is provided with weep ducts 39 for escape of plastic material in the event minor leakage should occur.

Rotary coupling 35 includes an upper thrust bearing 40 and a lower thrust bearing 41 which are respectively located directly above and below flange 34. A first thrust collar 42 defines a seat for thrust bearing 40. A second thrust collar 43 is threadedly connected to indexing shaft 36 and defines a seat for thrust bearing 41. The thrust collars are threadedly connected to each other and serve to maintain the associated parts in the illustrated form while permitting rotation of the indexing shaft relative to the downpipe.

Indexing shaft 36 is cooperatively associated with an indexing mechanism 44 which is supported by frame 10 and which may be of any suitable known type and construction that is capable of properly indexing the shaft and devices carried thereby to a predetermined number of timed stops corresponding to the number of molds employed, i.e. eight (8) stops in the form of the invention illustrated in FIGS. 1 through 6. One suitable commercially available indexing mechanism is known in the trade as a Parallel Index Drive which is manufactured by Commercial Cam & Machine Company, Chicago, Ill. The indexing mechanism is driven by an electric motor 45 through the intermediary of a drive shaft 46 and a right angle reducing gear unit 47.

Depending from and rotatable with the indexing shaft is a manifold unit 50 comprising a central body 51 which is threadedly connected to the lower end of the indexing shaft, as indicated at 52 in FIG. 4. Body 51 is formed with an inverted T-shaped passage consisting of a vertical portion 53, which communicates with shaft passage 37, and a pair of oppositely extending lateral portions 54, which communicate with each other and with portion 53. The manifold unit also comprises a pair of coaxial lateral transfer tubes 55 which are positioned to opposite sides of body 51. Each transfer tube is affixed to body 51 by screws 56 and has an axial passage 57 that communicates with a corresponding portion 54 of the T-shaped passage. Each transfer tube carries a parison head or die assembly 60.

Interposed between the outer end of each transfer tube and the corresponding parison head is a valve unit 61 which includes a flanged body 62 that is secured to its transfer tube and parison head by screws 63 and 64, respectively. Each body 62 is provided with a passage 65 which establishes communication between a transfer tube passage 57 and an inlet passage 66 in the corresponding parison head. An adjustable valve 67, which is threadedly mounted in each body 62, controls the flow of semi-fluid plastic 68 through its passage 65 and thence into the parison head. Each valve unit 61 constitutes, in effect, an extension of its transfer tube 55.

Parison heads 60 are preferably identical and one will now be described, having particular reference to FIG. 5. As is shown in detail in this view, each parison head includes a body 70 having a central vertical through passage 71 which communicates with inlet passage 66. A stationary mandrel 72 is positioned in passage 71 and is removably affixed to body 70 by screws 73. The lower portion of the mandrel defines an annular space 74 with the body and is contoured so as to equalize downward flow of plastic through the annular space. A ring 75 is retained in the illustrated position in the lower end of body 70 by a clamping ring 76 and screws 77 and 78. A movable mandrel 80 is secured by a screw 81 to a piston 82 which is carried by a piston rod 83. These parts are located in merging central bores in stationary mandrel 72. Ring 75 and mandrel 80 are spaced apart to define a downwardly and outwardly tapered annular orifice 84 and serve as the parison extrusion nozzle. A portion of an extruded parison formed by the nozzle is denoted by numeral 85.

Mounted on each parison head 60 is a mechanism 86 for adjusting the vertical position of mandrel 80 relative to ring 75 to thereby control the size of annular orifice 84 and the thickness of the extruded parison. The illustrated mechanism is of known construction and includes a base plate 87 having an opening through which rod 83 projects, a post 88, a compressed air cylinder-piston unit 89 which is pivoted to the post by a pin 90, an arm 91 which is pivoted at its upper end to unit 89 by a pin 92 and is secured at its lower end to a rock shaft 93, a lever 94 secured to the rock shaft, a lever 95 pivoted to the post and to the piston rod at 96 and 97, respectively, and a roller 98 which is carried at the free end of lever 95 and rides on the upper extremity of lever 94. The above-described parts and elements of mechanism 86 coact in the usual manner to adjustably control the vertical position of mandrel 80 relative to ring 75, as required.

The embodiment of the invention illustrated in FIGS. 1–6 includes a total of eight, preferably identical, stationary mold assemblies 100 which are mounted on support frame 10 at a level below manifold 50 and parison heads 60. The mold assemblies are equi-spaced along the circumference of an imaginary circle having a center which is coincident with the axis of rotary indexing shaft 36. The mold assemblies are so arranged that the vertical axis of the cavity of any selected mold, when closed, coincides with the vertical axis through the extrusion nozzle of one parison head when the parison head is indexed in position over the mold.

The construction and relationship of mold assemblies 100 to each other and to other devices are best shown in FIGS. 1, 3 and 6 to which reference is now had. Each mold assembly comprises a mold consisting of a pair of mold sections or halves 101 and 102 which are mounted for horizontal sliding movement along pairs of vertically spaced parallel bars 103 and 104. The mold halves are shown in open position in FIG. 1 and in closed position in FIGS. 3 and 6. Both mold halves are adapted to be actuated simultaneously and to be alternately moved to open position and closed position, at predetermined times during operation of the machine, by a compressed air cylinder-piston unit 105 which acts on mold half 101 and by a gear arrangement 106 which acts on mold half 102. The cylinder-piston unit is secured to frame member 19 by a bracket 107 and a pin 108 and to mold half 101 by a similar bracket 109 and pin 110. The gear arrangement includes a rack 111, which constitutes a part of at least one of slide rods 103, and a pinion 112. The mold halves are releasably locked in closed position by an air operated toggle device 113, which includes a cylinder-piston unit 114 that is pivotal relative to the support frame, as indicated at 115. Unit 114 is provided with a piston rod 116 which is pivotally connected by a pin 117 to a pair of links 118 and 119. Link 118 is connected to mold half 102 by a bracket 120 and a pivot pin 121. Link 119 is anchored to a frame post 122 by a pivot pin 123.

Positioned beneath each mold is a guide unit 125 which includes a pair of spaced, vertically disposed, parallel plates 126. Each plate has three guide slots, namely a first slot 127 and a second slot 128, which are vertical and rectilinear, and a third slot which consists of a vertical upper portion 129 and an inclined lower portion 130. Corresponding guide slots of both plates are identical in configuration and are arranged in parallel.

The guide unit houses a movable mold pin assembly 131 which includes a baseplate 132 and a mold pin 133 carried by the base plate. The mold pin is provided with conventional means (not shown) for transmitting air under pressure thereto and to the mold to perform the molding operation when the base plate is in the position illustrated by the broken lines in FIG. 6. The base plate is equipped with rollers 134 that ride in corresponding guide slots 130 and is pivotally coupled to a carrier plate 135 through the medium of a pin 136 and an upstanding lug 137 which is integral with the carrier plate. The carrier plate is equipped with rollers 139 and 140, which ride along corresponding guide slots 127 and 128, respectively, and a depending central lug 141, which is pivotally connected at 142 to the free end of vertically reciprocable piston rod 143 of a compressed air cylinder-piston unit 144.

When the mold pin assembly is in the position shown by the broken lines (FIG. 6), piston rod 143 is fully protracted and a parison previously introduced into the mold is undergoing blowing or cooling. Upon completion of the cooling step and actuation of mold halves 101 and 102 to open position, piston rod 143 is retracted and the parts, together with a plastic bottle 145 which was formed in the mold, are moved downwardly from their broken line position to their full line position. In the course of such movement rollers 134 coact with guide slot portions 130 in a manner to swing the mold pin assembly and bottle 145 ninety degrees in a counterclockwise direction about the axis of pivot pin 136.

Adjacent the lower end of each guide unit 125 is a conveyor means which may be of any desired construction known to the art. To the extent that it is illustrated in FIG. 1, the conveyor means comprises a downwardly and inwardly inclined upper chute 146 and a downwardly and outwardly inclined lower chute 147 which is connected to the upper chute. Chute 147 discharges to a conventional rotary conveyor, generally indicated by numeral 150, which, in turn, discharges to a bottle trimmer 151 of any suitable known construction. The conveyor means is equipped at its lower end with an air-actuated gate 152, which is hinged at 153, for shunting defective bottles to a receiving tube 154 which communicates with a scrap grinder (not shown).

The operation of the machine illustrated in FIGS. 1 through 6 will now be described. Plastic material consisting of a suitable thermoplastic composition in a semi-fluid state is extruded by extruder 20 through breaker plate 32 into passage 30 of adapter 29 and flows downwardly through downpipe 33 and rotary shaft 36 and thence into manifold unit 50. The stream of plastic material is divided in the inverted T-shaped passage in block 51 into branch streams flowing through corresponding transfer tubes 55 and valve units 62 and thence into parison heads 60. As is shown in FIG. 5, the plastic material 68 is admitted by a passage 66 into annual space 74 of each parison head and is extruded downwardly in the form of a hollow tube or parison 85 by extrusion nozzle elements 75 and 80.

It is assumed that rotary shaft 36 has been indexed by mechanism 44 so that the parison heads are aligned with a first pair of diametrically spaced mold assemblies 100 and that mold sections 101 and 102 of these assemblies are in open position and empty. When the proper length of plastic tube 85 is formed and positioned between the mold sections, the molds are closed by the devices earlier described with reference to FIG. 6. As the molds are closed, the plastic tubes are severed immediately below the extrusion nozzles by conventional means (not shown). As extrusion of the hollow plastic tube continues, the indexing mechanism and associated devices rotate shaft 36 to bring the parison heads 60 in alignment with the next adjacent molds where the above-described procedure is repeated. That procedure is repeated for each successive pair of diametrically spaced mold assemblies.

Immediately after the molds of the first pair of mold assemblies are closed, blowing air at proper pressure is introduced into each plastic tube by way of a corresponding mold pin 133 and the tubes are blown to form bottles 145. The plastic begins to cool upon contact with the mold walls. When sufficient time has elapsed for the plastic to solidify, the molds are opened automatically and the mold pins and associated devices lower plastic bottles 145 to the full line positions shown in FIGS. 1 and 6, as earlier described, whence the bottles are conveyed to bottle trimmers 151 or to receiving tube 154, as also earlier described.

The time required to blow a plastic tube 85, cool a blown bottle 145, open the mold in which the bottle is formed and finally eject the finished bottle is usually from two to three times the time required for the extrusion of a proper length of plastic tube 85. It is assumed, for example, that the time required for extrusion of a plastic tube, which is to be blown to form a bottle of one-half gallon capacity, is 7.2 seconds and that the combined blowing and cooling time is approximately 15.0 seconds. It is further assumed that each indexing of the rotary shaft requires 1.2 seconds. With these time factors, a total time interval of 21.6 seconds is available from the time each mold closes until it is actuated to fully open position to receive a new plastic tube. Accordingly, there are allowed 15.0 seconds for blowing and cooling and 6.6 seconds for ejection and return of a mold pin assembly to position in its mold. It will hence be evident that plastic tube or parison extrusion can be continuous without any need for interrupting flow of the plastic, such as by intermittently stopping and starting the extruder, using a reciprocating screw or employing an accumulator. It should be borne in mind, however, that flow of the semi-fluid plastic material need not be continuous, but may, if desired, be intermittent.

One of the important advantages of the machine of this invention is that it is capable of simultaneously producing plastic bottles of at least two different sizes. This permits the manufacture of, for example, both quart bottles and half-gallon bottles at the same time. To this end, the machine may be modified in the manner and to the extent shown in FIG. 7. In this modification, a manifold unit 155, corresponding to manifold unit 50, includes a body 156, similar to body 51, and a pair of transfer tubes 157 and 158 in place of transfer tubes 55. Transfer tubes 157 and 158 are horizontally offset, as shown, instead of being coaxial, as in the case of tubes 55. The transfer tubes carry different size parison heads 160 and 161.

This form of the invention also utilizes a total of eight molds, namely four molds 162 of one size and four molds 163 of a larger size. As in the case of the earlier described form of the invention, the molds are equi-spaced about the circumference of an imaginary circle having a center coincident with the axis of rotary shaft 36. Molds 162 and 163 are arranged alternately so that each mold of one size is positioned 90° from the next adjacent mold of the same size. Each mold 162 is successively serviced by parison head 160 while each mold 163 is successively serviced by parison head 161 in the course of each complete revolution of indexing shaft 36. The parison heads are indexed through 90° increments or four stops instead of 45° increments or eight stops in the case of the earlier described form of the invention. Any difference in parison size to meet the requirements of the different size molds can be readily provided for by adjustment of valves (not shown) which correspond to valves 67.

From the foregoing, it is believed that the objects, advantages, construction and operation of the present invention will be readily comprehended by persons skilled in the art, without further description. Although the invention has been herein shown and described in several practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

I claim:

1. In a machine for manufacturing blown hollow articles, support means, a source of semi-fluid plastic material mounted on the support means, a parison head including an extrusion nozzle adapted to extrude the plastic material in tubular form, flow means for transmitting a stream of the plastic material from the source to the nozzle and comprising a hollow rotary shaft communicating with the source of plastic material and the nozzle, said parison head being carried by and rotatable with the shaft and being positioned to one side of the axis of rotation of the shaft, a plurality of mold assemblies secured to the support means and spaced along the circumference of a circle having a center that is coincident with the axis of rotation of the shaft, and drive means for imparting rotation to the shaft and effecting sequential alignment of the nozzle with each mold assembly in the course of each complete revolution of the shaft.

2. In a machine for manufacturing blown hollow articles, support means, a source of semi-fluid plastic material mounted on the support means, a parison head including an extrusion nozzle adapted to extrude the plastic material downwardly in tubular form, flow means for transmitting a stream of the plastic material from the source to the nozzle and comprising a vertically disposed hollow rotary shaft communicating with the source of plastic material and the nozzle, said parison head being carried by and rotatable with the shaft and being positioned to one side of the axis of rotation of the shaft, a plurality of mold assemblies secured to the support means, said mold assemblies lying in a substantially horizontal plane and being spaced along the circumference of a circle having a center that is coincident with the axis of rotation of the shaft, and drive means for imparting rotation to the shaft and effecting sequential alignment of the nozzle with each mold assembly in the course of each complete revolution of the shaft.

3. In a machine for manufacturing blown hollow articles, support means, a source of semi-fluid plastic material mounted on the support means, a pair of parison heads, each parison head including an extrusion nozzle adapted to extrude the plastic material in tubular form, flow means for transmitting the plastic material from the source to each nozzle, said flow means comprising a hollow rotary shaft communicating at one end with the source of plastic material, a manifold unit secured to and rotatable with the shaft and including a pair of transfer tubes extending outwardly from the axis of rotation of the shaft and spaced angularly relative to said axis, each parison head being secured to the outer end of a corresponding transfer tube, each transfer tube communicating with the other end of the shaft and with a corresponding nozzle, a plurality of mold assemblies secured to the support means and spaced along the circumference of a circle having a center that is coincident with the axis of rotation of the shaft, and indexing drive means for imparting rotation to the shaft and effecting sequential alignment of the nozzle of each parison head with preselected mold assemblies in the course of each complete revolution of the shaft.

4. In a machine for manufacturing blown hollow articles, support means, a source of semi-fluid plastic material mounted on the support means, a pair of parison heads, each parison head including an extrusion nozzle adapted to extrude the plastic material downwardly in tubular form, flow means for transmitting the plastic material from the source to each nozzle, said flow means comprising a vertically disposed hollow rotary shaft communicating at its upper end with the source of plastic material, a manifold unit secured to and rotatable with the shaft and including a pair of transfer tubes extending outwardly from the axis of rotation of the shaft and spaced angularly relative to said axis, each parison head being secured to the outer end of a corresponding transfer tube, each transfer tube communicating with the lower end of the shaft and with a corresponding nozzle, a plurality of mold assemblies secured to the support means, said mold assemblies lying in a substantially horizontal plane and being spaced along the circumference of a circle having a center that is coincident with the axis of rotation of the shaft, and indexing drive means for imparting rotation to the shaft and effecting sequential alignment of the nozzle of each parison head with preselected mold assemblies in the course of each complete revolution of the shaft.

5. A machine according to claim 4 including valve means for controlling flow of the plastic material to each nozzle.

6. A machine according to claim 4 wherein the parts are so constructed and arranged that the indexing drive means effects sequential alignment of the nozzle of each parison head with all of the mold assemblies in the course of each complete revolution of the shaft.

7. A machine according to claim 4 wherein the rotary shaft and the manifold unit define an inverted generally T-shaped flow passage.

8. A machine according to claim 4 including valve means for controlling flow of the plastic material to each nozzle, wherein the parts are so constructed and arranged that the indexing drive means effects sequential alignment of the nozzle of each parison head with all of the mold assemblies in the course of each complete revolution of the shaft, and wherein the rotary shaft and the manifold unit define an inverted generally T-shaped flow passage.

9. A machine according to claim 4 wherein the parts are so constructed and arranged that the indexing drive means effects sequential alignment of the nozzle of one parison head with certain of the mold assemblies and sequential alignment of the nozzle of the other parison head with the remainder of the mold assemblies in the course of each complete revolution of the shaft.

10. In a machine for manufacturing blown hollow articles, support means, a source of semi-fluid plastic material mounted on the support means, a pair of parison heads, each parison head including an extrusion nozzle adapted to extrude the plastic material downwardly in tubular form, flow means for transmitting the plastic material from the source to each nozzle, said flow means comprising a vertically disposed hollow rotary shaft communicating at its upper end with the source of plastic material, a manifold unit secured to and rotatable with the shaft and including a central body connected to the lower end of the shaft and having an inverted generally T-shaped flow passage comprising a vertical portion, which communicates with the shaft, and a pair of lateral portions, and a pair of transfer tubes connected to and extending generally laterally beyond opposite sides of the body, each parison head being secured to the outer end of a corresponding transfer tube, each transfer tube communicating with a corresponding lateral portion of the body passage and a corresponding nozzle, a plurality of mold assemblies secured to the support means, said mold assemblies lying in a substantially horizontal plane and being spaced along the circumference of a circle having a center that is coincident with the axis of rotation of the shaft, and indexing drive means for imparting rotation to the shaft and effecting sequential alignment of the nozzle of each parison head with preselected mold assemblies in the course of each complete revolution of the shaft.

11. A machine according to claim 10 wherein the rotary shaft and the manifold unit define an inverted generally T-shaped flow passage.

12. In a machine for manufacturing blown hollow articles, support means, a source of semi-plastic material mounted on the support means, a first parison head and a second parison head, each parison head including an extrusion nozzle adapted to extrude the plastic material downwardly in tubular form, flow means for transmitting the plastic material from the source to each nozzle, said flow means comprising a vertically disposed hollow rotary shaft communicating at its upper end with the source of plastic material, a manifold unit secured to and rotatable with the shaft and including a pair of transfer tubes extending outwardly from the axis of the shaft and spaced angularly relative to said axis, each parison head being secured to the outer end of a corresponding transfer tube, each transfer tube communicating with the lower end of the shaft and with a corresponding parison head, a plurality of first mold assemblies secured to the support means and lying in a substantially horizontal plane, a plurality of second mold assemblies secured to the support means and lying in a substantially horizontal plane, said mold assemblies being spaced along the circumference of a circle having a center that is coincident with the axis of rotation of the shaft, said second mold assemblies being spaced along the circumference of a circle having a center that is coincident with the axis of rotation of the shaft, and indexing drive means for imparting rotation to the shaft and effecting sequential alignment of the nozzle of the first parison head with each first mold assembly and sequential alignment of the nozzle of the second parison head with each second mold assembly in the course of each complete revolution of the shaft.

13. A machine according to claim 12 including valve means for controlling flow of the plastic material to each nozzle.

14. A machine according to claim 12 wherein a first mold assembly is positioned intermediate successive pairs of second mold assemblies.

15. A machine according to claim 12 wherein said circumferences are substantially coincident.

16. A machine according to claim 12 including valve means for controlling flow of the plastic material to each nozzle, wherein a first mold assembly is positioned intermediate successive pairs of second mold assemblies and wherein said circumferences are substantially coincident.

References Cited
UNITED STATES PATENTS

| | | | |
|---|---|---|---|
| 3,000,052 | 9/1961 | Sombier | 18—5 X |
| 3,154,809 | 11/1964 | Fischer | 18—5 |
| 3,205,536 | 9/1965 | Funck | 18—30 |
| 3,243,847 | 4/1966 | Fogelberg et al. | 18—5 |

J. SPENCER OVERHOLSER, *Primary Examiner.*

WILBUR L. McBAY, *Examiner.*